United States Patent
Hensley

(10) Patent No.: US 9,713,401 B1
(45) Date of Patent: Jul. 25, 2017

(54) ADJUSTABLE DEEP FRYER STAND

(71) Applicant: Sean Hensley, Jacksonville, FL (US)

(72) Inventor: Sean Hensley, Jacksonville, FL (US)

( * ) Notice: Subject to any disclaimer, the term of this patent is extended or adjusted under 35 U.S.C. 154(b) by 0 days.

(21) Appl. No.: 15/369,932

(22) Filed: Dec. 6, 2016

(51) Int. Cl.
*A47J 37/12* (2006.01)
*F16M 11/18* (2006.01)
*F16M 11/04* (2006.01)

(52) U.S. Cl.
CPC ........ *A47J 37/1271* (2013.01); *F16M 11/046* (2013.01); *F16M 11/18* (2013.01)

(58) Field of Classification Search
CPC ........ A47J 37/1271; A47J 37/00; A47J 37/12; A47J 37/04; A47J 43/18; A47J 25/58; F16M 11/046; F16M 11/18; F24B 3/00; B66D 1/60; B66C 19/00
USPC ...... 99/407, 403, 419–421 HV; 212/97–116; 248/132
See application file for complete search history.

(56) References Cited

U.S. PATENT DOCUMENTS

| | | | | |
|---|---|---|---|---|
| 4,043,260 A | * | 8/1977 | LaPour | A47J 37/0763 126/30 |
| 5,970,852 A | * | 10/1999 | Bourgeois | A47J 27/04 126/30 |
| 6,314,955 B1 | * | 11/2001 | Boetcker | A47J 36/2477 126/25 R |
| 6,439,107 B1 | * | 8/2002 | Bourgeois | A47J 27/04 126/30 |
| D486,689 S | | 2/2004 | Lu | |
| 6,698,335 B1 | * | 3/2004 | Bourgeois | A47J 27/04 126/30 |
| 6,711,992 B1 | * | 3/2004 | McLemore | A47J 27/04 99/339 |
| 6,711,993 B2 | * | 3/2004 | Robertson | A47J 37/0763 126/25 A |
| 7,464,640 B2 | * | 12/2008 | Vasquez | A47J 37/1295 212/97 |
| D599,166 S | * | 9/2009 | Knypstra | A47J 37/00 D7/403 |
| 7,707,929 B1 | * | 5/2010 | Bourgeois | A47J 36/26 99/340 |
| 7,766,004 B1 | * | 8/2010 | Bourgeois | A47J 36/26 126/25 R |
| 7,980,241 B1 | * | 7/2011 | White | A47J 33/00 126/25 A |
| 8,375,847 B1 | * | 2/2013 | Anganes | A47J 37/1219 126/25 A |
| 8,783,241 B1 | * | 7/2014 | Sauter | F24C 1/16 126/25 A |
| 8,887,435 B2 | * | 11/2014 | Ugiansky | A01M 23/22 43/60 |
| 2005/0051035 A1 | * | 3/2005 | Johnston, Sr. | A47J 37/1271 99/403 |

(Continued)

*Primary Examiner* — Nkeisha Smith
(74) *Attorney, Agent, or Firm* — Lawrence J. Gibney; Mitchell Ghaneie

(57) ABSTRACT

It is important to have a safe cooking environment when cooking outdoors and this is particularly important when heating cooking oil on an uneven ground surface. This device will support a cooking pot on a platform that is elevated above the ground and allow the oil to be heated while also insuring that the pot remain level and prevent the structure from tipping. In the event that the structure tips or allows any of the oil to splash outside the container personal injury may occur and this device prevent that occurrence.

1 Claim, 3 Drawing Sheets

(56) References Cited

U.S. PATENT DOCUMENTS

2006/0272633 A1* 12/2006 Osias ................. A47J 37/1276
                                                    126/383.1

* cited by examiner

ADJUSTABLE DEEP FRYER STAND

FIELD OF THE INVENTION

This is a device that will allow a person to have a secure frame on which to place a pot that is filled with cooking oil that will remain level on the ground regardless of the ground surface. Because fryers involve the use of oil, which is heated to extreme temperatures for an extended period of time, it is important that the device is able to support the weight of the pot and remain upright during the cooking process and not tip over.

PRIOR ART

There are other prior references to fryer stands. A representative of this can be found at Osias U.S. Patent Publication 2006/0272633 which is a safe turkey deep fryer with a defined structure. The difference between the current application and the Osias patent is that the present application incorporates the use of pulleys and adjustment cables to ensure that the pot stays level.

Another representative patent can be found at Carter U.S. Pat. No. 7,827,906 for a deep fryer cooking apparatus with a pre-determined base.

Another reference can be found at Lu U.S. D486,689 which is a design patent for a turkey fryer stand.

BRIEF SUMMARY OF THE INVENTION

This device will allow an individual to place a pot on a base member inside a defined structure. This pot is to be heated with a heat source through the bottom. The idea of frying the Thanksgiving turkey has given rise to the use of the turkey fryer that has a base. A pot with oil is placed on the base and heat is applied to the bottom of the pot; it is not unusual for the oil to reach a temperature of 250-350 degrees Fahrenheit during the cooking process. At the appropriate time the turkey is carefully lowered into a pot for cooking and cooked in the oil for the appropriate amount of time.

This type of device should always be used away from any flammable liquids or material and should never be used indoors. Ideally the fryer stand should be used in an outdoor environment. In certain circumstances it may be difficult to find a level ground surface and this device will allow the user to position the pot so that it will always remain level. The structure of the device will also minimize the danger of accidentally tipping the pot.

The pot will rest securely within the frame that extends the entire length of the fryer. A plurality of rings will surround the pot when the pot has been placed on the device.

On the top ring a plurality of adjustment cables and pulleys will allow the user to adjust the pot prior to filling the pot with oil so that it will always remain level during the cooking process. The adjustment cables will automatically adjust the position of the pot with the fryer frame to avoid the pot from shifting during the cooking process and prevent the hot oil for accidentally splashing outside the pot and starting a fire or causing injury.

NUMBERING REFERENCES

Figure 1:
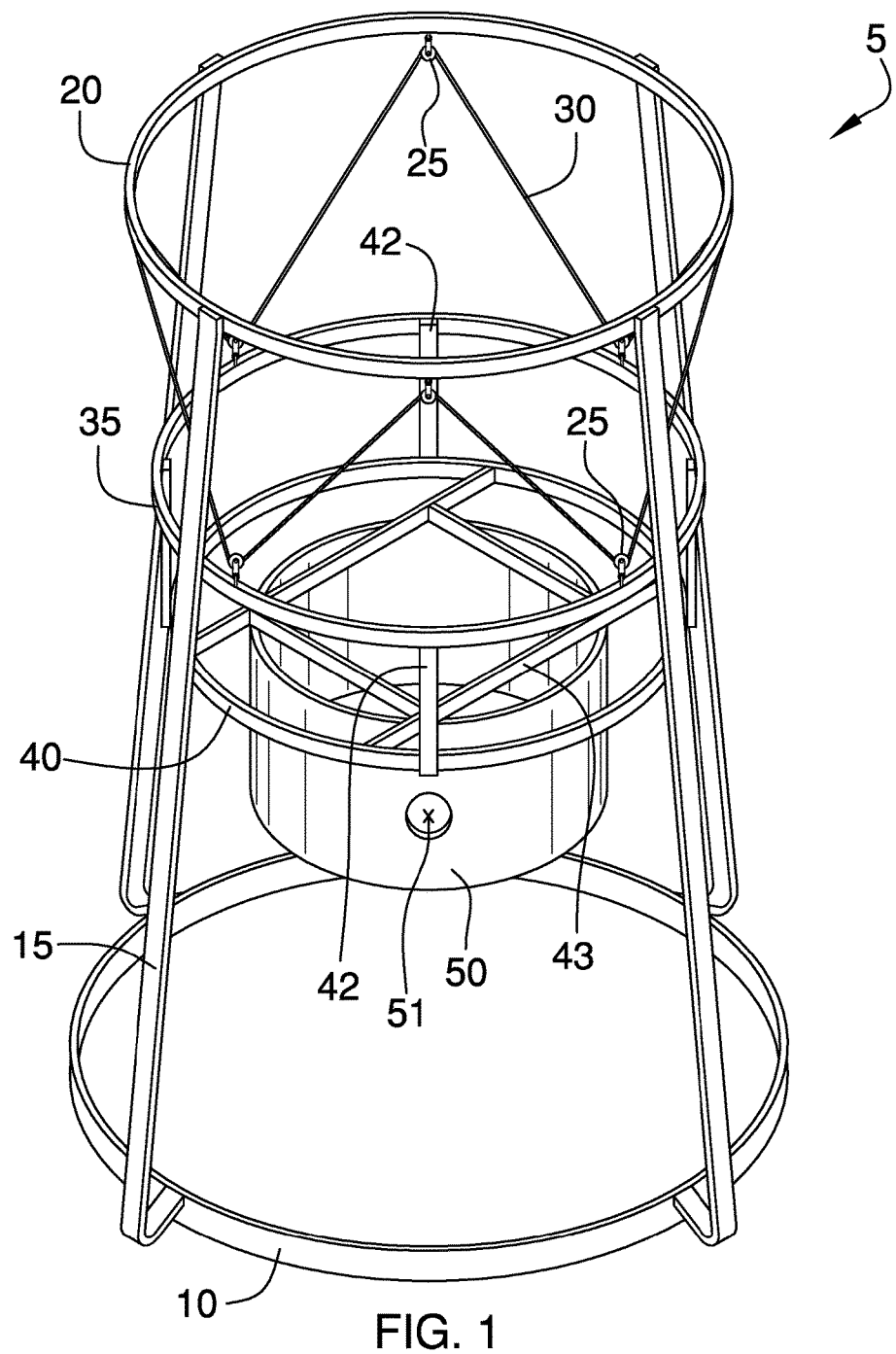
FIG. 1 is of front isometric view of the device.
Figure 2:
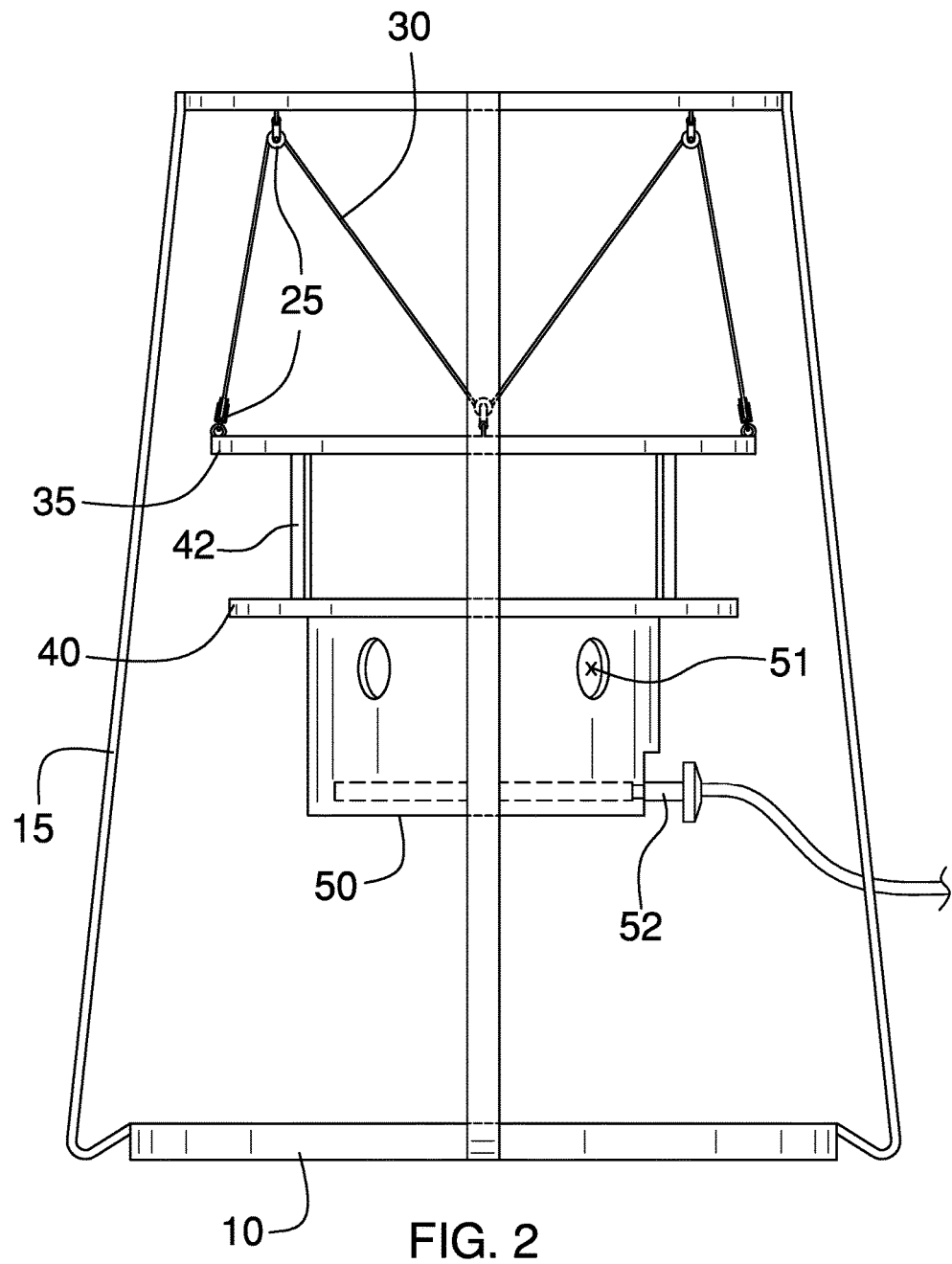
FIG. 2 is a side view of the device.
Figure 3:
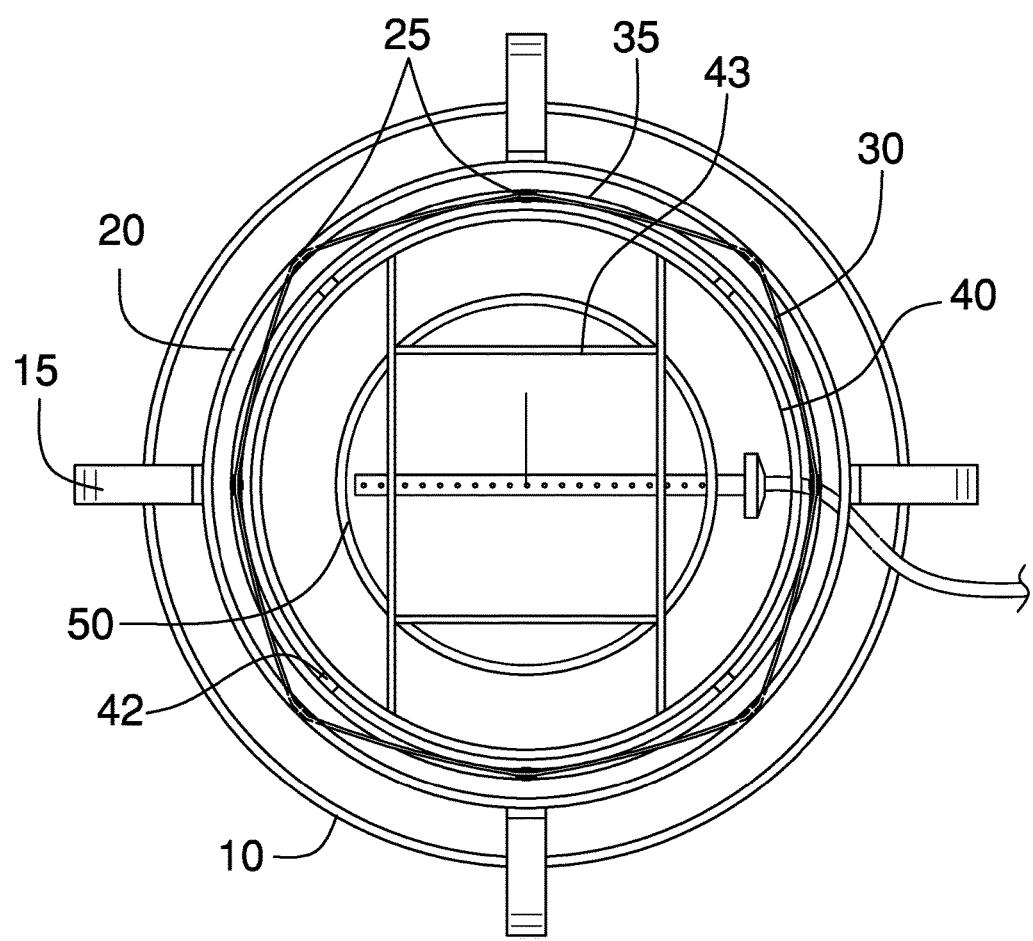
FIG. 3 is a top view of the device.

5—Device
10—Base ring
15—Stanchion
20—Top Ring
25—Pulleys
30—Adjustment Cable
35—Stabilizer Ring
40—Support Ring
42—Support Tab
43—Platform
50—Heat Shield

DETAILED DESCRIPTION OF THE EMBODIMENTS

The device 5 consists of a pre-determined frame which will consist of a base 10 and stanchions 15 which attach to the base as well as a top ring 20. The stanchions extend vertically but are angled inward to attach to the top ring 20 and provide a taper to the frame. This taper prevents the structure from shifting and tipping over. The base 10 is larger than the other rings that have been placed on the structure to insure that the frame is tapered going up the structure to provide stability to the frame. Between the base 10 and the top ring 20 are two additional rings, a support ring 40 and a stabilizer ring 35. The support ring 40 will provide a platform 43 on which to rest the pot (not depicted).

The stabilizer ring 35 is located above the support ring 40 but below the top ring 20 and connected to the support ring by a support tab 42 such as depicted in FIG. 1. The stabilizer ring 35, which is not attached to the stanchions provides a structure on which to attach a plurality of pulleys 25 through which the adjustment cable 30 is threaded; the pulleys 25 are attached to the top ring and the stabilizer ring 35. The stabilizer ring 35 helps to insure that the fryer remains upright and level during the cooking process.

The pot (not depicted) will be placed in the center of the device that is surrounded by the structure and the pot will rest on the platform 43 that is incorporated as part of the support ring 40. The heat source is placed below the pot through an opening in the heat shield 50 as a way to heat the oil while the meal is cooked. The opening through the heat shield and the platform are found in the prior art and are not being specifically claimed in this application.

Connected to the top ring 20 will be the plurality of pulleys 25 through which an adjustment cable is threaded. An adjustment cable 30 will be intertwined through the pulleys 25 so that the pot will remain level and upright during the cooking process irrespective of the ground surface. Because the support ring is not attached to the stanchions the pot will automatically attain a vertical orientation when the pot is placed on the platform that is part of the support ring. As the fryer is placed on the platform the fryer will self-right because of the pulleys and adjustment cable that have been provided.

A heat source, which is not being claimed, is provided near the bottom of the structure to heat the oil in the pot. This heat source will heat the oil in the fryer to between 250 and 350 degrees Fahrenheit.

It is important that the pot remain level because there is an unavoidable amount of splashing that occurs during the cooking process and all efforts must be used to prevent oil from splashing out of the pot and causing a fire. Additionally it is imperative that all measures to prevent the device from tipping to prevent personal injury to anyone standing in the vicinity of a container of hot oil.

Additionally because of the tapered structure the device will also prevent the pot or from tipping during the cooking process and possible causing a fire or personal injury to those in the area.

While the embodiments of the invention have been disclosed, certain modifications may be made by those skilled in the art to modify the invention without departing from the spirit of the invention.

The inventor claims:

1. A deep fryer stand which is comprised of:
a base ring;
a plurality of stanchions;
wherein the plurality of stanchions have a first end and a second end;
wherein the first end of the plurality of stanchions is attached to the base ring;
a top ring;
wherein the second end of the plurality of stanchions is attached to the top ring;
wherein the base ring is larger in diameter than the top ring;
a support ring;
wherein the support ring is smaller in diameter than the base ring;
wherein a platform on which to place a pot is incorporated into the support ring;
wherein a heat shield is placed below the platform;
wherein an opening is provided on the heat shield;
a stabilizer ring;
wherein a stabilizer ring is provided between the support ring and the top ring;
wherein the stabilizer ring is larger in diameter than the support ring but smaller in diameter than the base ring;
a plurality of support tabs;
wherein the plurality of support tabs connect the support ring to the stabilizer ring;
a plurality of pulleys;
wherein the plurality of pulleys are secured to the stabilizer ring and the top ring;
an adjustment cable;
wherein the adjustment cable is threaded through the pulleys;
a heat source;
wherein the heat source is placed through the opening in the heat shield and below the platform.

* * * * *